US006546646B1

(12) United States Patent
Thomas

(10) Patent No.: US 6,546,646 B1
(45) Date of Patent: Apr. 15, 2003

(54) METHOD AND APPARATUS FOR MICROWAVE PROCESSING OF PLANAR MATERIALS

(75) Inventor: Donald S. Thomas, Wollstonecraft (AU)

(73) Assignee: Microwave Processing Technologies Pty. Limited, Wollstonecraft (AU)

( * ) Notice: Subject to any disclaimer, the term of this patent is extended or adjusted under 35 U.S.C. 154(b) by 0 days.

(21) Appl. No.: 09/889,062

(22) PCT Filed: Jan. 11, 2000

(86) PCT No.: PCT/AU00/00012

§ 371 (c)(1), (2), (4) Date: Aug. 29, 2001

(87) PCT Pub. No.: WO00/42371

PCT Pub. Date: Jul. 20, 2000

(51) Int. Cl.$^{7}$ .............................. F26B 5/04; H05B 6/50; A01J 21/00

(52) U.S. Cl. .............................. 34/412; 34/259; 34/265; 34/565; 426/241; 219/707

(58) Field of Search .......................... 34/259, 263, 265, 34/402, 411, 412, 418, 558, 565, 218; 426/107, 235, 236, 241; 219/707, 709, 711

(56) References Cited

U.S. PATENT DOCUMENTS 3,293,765 A 12/1966 Winkler et al.
3,404,462 A 10/1968 Hanson et al.
3,872,603 A 3/1975 Williams et al.
4,332,091 A 6/1982 Bensussan et al.
4,720,924 A 1/1988 Hradecky et al.
5,980,962 A * 11/1999 Bracken et al. ............. 426/421
6,128,831 A * 10/2000 Durance et al. .............. 34/412
6,176,951 B1 * 1/2001 Bielfeldt et al. ........... 156/62.2
6,402,877 B1 * 6/2002 Bielfeldt ..................... 156/264
6,484,418 B1 * 11/2002 Hada et al. ................... 34/487

FOREIGN PATENT DOCUMENTS

| | | |
|---|---|---|
| EP | 0437267 | 7/1991 |
| FR | 2473954 | 7/1981 |
| GB | 1211789 | 11/1970 |
| WO | 9602153 | 2/1996 |
| WO | 9853711 | 12/1998 |

* cited by examiner

*Primary Examiner*—Pamela Wilson
(74) *Attorney, Agent, or Firm*—Ladas & Parry

(57) ABSTRACT

A process and apparatus for removing moisture from a material, without spoiling the processed product, through the implementation of microwave irradiation heating, drying, dehydration, curing, disinfection, pasteurization, sterilization or vaporization or any combination thereof. The process and apparatus provide for a controlled processing of planar material, a combination of materials organic or inorganic, in natural or processed form, in sheet leaf, granular, prepared or transportable planar form.

31 Claims, 13 Drawing Sheets

COMPARATIVE MOISTURE TAKE-UP WITH ATMOSPHERE EXPOSURE AFTER DRYING PROCESS - CRITICAL CONSIDERATION IN MANUFACTURING PROCESS OF TEST KITS AFTER CARD DRYING. GRAPHS INDICATE SEALING OF CELLULOSE SURFACE CELLS TO FORM VAPOUR BARRIER.

METHOD AND APPARATUS FOR MICROWAVE PROCESSING OF PLANAR MATERIALS

TECHNICAL FIELD

This invention relates to a process and apparatus for removing moisture from a material without substantially spoiling the material. Described herein are a process of and apparatus for microwave irradiation heating, drying, dehydration, curing, disinfection, pasteurization, sterilization or vapourization of any one or any combination of one or more of these processes in the processing of materials which are typically in planar form or able to be arranged so as to be in planar form.

BACKGROUND OF THE PRESENT INVENTION

Planar materials in the context of this invention means any organic or inorganic material or any combination of such materials presented in its natural form or in a pre-prepared or processed form or in a transportable form suitable for processing by the process and apparatus of this invention.

Planar materials in this context may be in single or multiple sheet or composite or laminated or other form in unit size of uniform shapes and dimensions or varying sizes, shapes and dimensions or process transportation size within the limiting dimensions determined by the process and apparatus of this invention.

Planar materials in the context of this invention may also be natural or preprocessed vegetable matter in sliced, diced or granular form including herbs and spices, grain seeds and nuts, rootstock and leaf materials and chemical compounds and mineral materials in granular form or solution form—all capable of transportation by an enclosed or other form of conveyance having a planar configuration suitable for application within the limiting dimensions determined by the process and apparatus of this invention.

The priority application of the invention is related to the field of medical, veterinary, food and environmental diagnostics, but other industrial fields of application are equally relevant.

The world is faced with a crisis in the delivery of health care services in developing countries due to a resurgence of infectious and tropical diseases such as malaria, tuberculosis, hepatitis and filariasis.

The World Health Organization estimates that more than 2 billion persons worldwide are infected with one or other of these major diseases which are in epidemic or endemic form in many developing countries. This has created enormous diagnosis logistical and resource problems due to the masses of people involved, the land areas of the countries concerned and hopelessly inadequate infrastructure medical support facilities. These problems and health risk is compounded by the increasing mobility of the world population and relocation of displaced persons and refugees.

Malaria is endemic in many countries and is one of the most serious and complex health problems facing the world community as it enters the 21st century. It has been estimated that there are between 300 and 500 million clinical cases of malaria each year with between 2 and 3 million deaths as a result of the disease. Malaria has now reached epidemic proportions due mainly to the failure of conventional therapies against multidrug resistant strains of the malarial parasite. As the emergence of disease drug resistance escalates in all malaria endemic areas early diagnosis is critical for the application of alternative chemotherapeutic agents.

Tuberculosis kills or debilitates more adults than any other disease with more than one third of the world's population infected with the TB bacillus. Every year 6 to 8 million people develop the disease which, if early diagnosed, can now be inexpensively and effectively treated.

Hepatitis virus has infected more than 2 billion people worldwide of which some 325 million are chronically infected carriers of the virus. Hepatitis B is directly related to approximately 2 million deaths a year. The WHO estimates that by the year 2000 there could be more than 400 million carriers of this disease.

Filariasis is a parasitic disease affecting people in tropical regions. It is highly debilitating and has serious economic and social consequences. It is estimated that 750 million people live in endemic areas with 76 countries affected and 96 million people infected.

Other diseases such as pneumonia, tetanus, trachoma, dengue fever and schistosmiasis also affect millions of people worldwide and are of increasing international concern.

Animal diseases and the contamination of land air and water resources and the environment has also led to the increasing incidence of food contamination and outbreaks of environmental diseases. These contamination diseases are expected to increase unless early diagnosis technology is introduced to permit timely remedial action to be taken.

The clinical diagnosis of malaria and many other diseases is conventionally based on clinical criteria supported by microscopic examination of whole blood. This diagnostic process is time consuming, labour intensive, expensive, requires considerable technical skills and support facilities and is not practical for mass, widespread in-field application.

Scientific technology breakthroughs have occurred in the area of reliable, accurate, simple immunochromatographic, on the spot diagnostic tests for medical, veterinary, agricultural, food and environmental applications. The scientific technology is patented worldwide and is in field use for a number of diagnostic applications.

In excess of 200 existing diagnostic fields of practice have been identified as potential markets for replacement by this immunodiagnostic testing technology.

The full scientific and human health potential benefit of this technology can only be realised on a world wide basis by the inexpensive mass production of such test kits having long shelf life, stable performance, and suitable for non refrigerated distribution for in-field use. The manufacture, packaging, shelf life, stability and reliability of the immunodiagnostic test technology is highly dependent on the controlled total or near total removal of moisture from the kit housings and conjugate materials.

The test kit housings are traditionally manufactured in cardboard material for their biodegradable qualities. Alternative inorganic materials which would be moisture free would impose serious environmental disposal problems.

The drying of diagnostic kit housings by conventional methods such as lyophilizer, hot air drying, vacuum drying, freeze drying, desiccant drying and long term low humidity storage have all proved unsuccessful for high speed high quality continuous process mass production which is necessary to guarantee the economic viability and in-field reliability of the diagnostic technology for mass application.

OBJECTS OF THIS INVENTION

Objects of this invention are to provide a process and apparatus for removing moisture from a material without substantially spoiling the material.

Other objects of this invention with respect to the application of the invention in the field of immunodiagnostics are to provide a process of and apparatus for the controlled total or near total or selective or differential removal of moisture from immunodiagnostic test kit housings and other planar materials or combination of planar materials under continuous production line conditions without spoiling the material for its intended purpose or resulting in the spoiling of the immunodiagnostic test process for which the use of the material is intended due to moisture take-up of the processed housings.

A further object of this invention is to provide a process and apparatus for the controlled processing of planar materials or combination of planar materials organic or inorganic, in natural or processed form, in sheet leaf or granular or prepared or transportable planar form for controlled irradiation heating, drying dehydration pasteurisation, sterilisation, disinfection or curing or any one or more of these processes under continuous process production line conditions without spoiling the material for its intended use.

DISCLOSURE OF THE INVENTION

According to one embodiment of this invention there is provided a process for removing moisture from a material without substantially spoiling the material, said process comprising:

(a) subjecting the material to a controlled humidity environment, said environment being at a temperature and partial vapour pressure of water which do not spoil the material, and, in which the partial vapour pressure of water of said environment is substantially below saturation;

(b) selectively and differentially irradiating at least one selected area of the material, the at least one selected area being less than the entire area of the material, without substantially irradiating a non-selected portion of the material, the selected and differential irradiation being in the environment with an amount of microwave irradiation effective to increase the moisture at the surface of the material whereby the partial vapour pressure of water at the surface of the material is greater than the partial vapour pressure of water of the environment whereby moisture is transferred from the surface to the environment, wherein the amount of said microwave irradiation and the selected area which is irradiated do not spoil the material; and (c) maintaining (i) the temperature of the environment, and, (ii) the partial vapour pressure of water of said environment substantially below saturation, whereby the material is not spoiled during step (b);

said amount of microwave irradiation being sufficient to substantially maintain said vapour pressure at the surface of the material, until a required amount of moisture has been removed from said material, without substantially reducing the surface temperature of the material and being sufficient to maintain the surface temperature of the material at substantially the same temperature as the dry bulb temperature of the environment.

A further embodiment is a material from which moisture has been removed without substantially spoiling the material by the process of the invention.

According to another embodiment of this invention there is provided an apparatus for removing moisture from a material without substantially spoiling the material, said apparatus comprising:

(a) means for subjecting the material to a controlled humidity environment, said environment being at a temperature and partial vapour pressure of water which do not spoil the material, and, in which the partial vapour pressure of water of said environment is substantially below saturation;

(b) means for selectively and differentially irradiating at least one selected area of the material, the at least one selected area being less than the entire area of the material, without substantially irradiating a non-selected portion of the material, the selected and differential irradiation being in the environment with an amount of microwave irradiation effective to increase the moisture at the surface of the material whereby the partial vapour pressure of water at the surface of the material is greater than the partial vapour pressure of water of the environment whereby moisture is transferred from the surface of the material to the environment, wherein the amount of said microwave irradiation and the selected area which is irradiated do not spoil the material; and (c) means for maintaining (i) the temperature of the environment, and, (ii) the partial vapour pressure of water of said environment substantially below saturation, whereby the material is not spoiled during processing when the material is irradiated with microwaves;

said amount of microwave irradiation being sufficient to substantially maintain said vapour pressure at the surface of the material, until a required amount of moisture has been removed from said material, without substantially reducing the surface temperature of the material and being sufficient to maintain the surface temperature of the material at substantially the same temperature as the dry bulb temperature of the environment.

In various forms of the process step (a) may comprise:

(a) subjecting the material to a controlled temperature and humidity environment, said environment being at a temperature and partial vapour pressure of water which do not spoil the material, and, in which the partial vapour pressure of water of said environment is substantially below saturation; or (a) subjecting the material to a controlled pressure and humidity environment, said environment being at a pressure, temperature and partial vapour pressure of water which do not spoil the material, and, in which the partial vapour pressure of water of said environment is substantially below saturation or (a) subjecting the material to a controlled pressure, temperature and humidity environment, said environment being at a pressure, temperature and partial vapour pressure of water which do not spoil the material, and, in which the partial vapour pressure of water of said environment is substantially below saturation.

The material may be a wood pulp product. The wood pulp product may be in substantially planar form. Examples of wood pulp products are paper and cardboard. The material may be in any suitable shape of configuration which is suitable for irradiating with microwaves. For example, the material may be in the form of a card. Typically the card is made of paper or board or cardboard or other suitable material. The card may be any suitable shape (e.g.

rectangular, square, triangular, circular, parallelogram, elliptical, irregular, conical, semicircular, semi elliptical, etc). Advantageously, the card may be in the form of a test strip. The card may be unfolded or folded. Advantageously, amongst its many possible uses the card may be used to support a product either on the card or adsorbed or absorbed in the card, for example.

The material may be in the form of a housing. Typically the housing is made of paper or board or cardboard or other suitable material. A housing in the form of a foldable card is especially suitable. The housing may have one, two, three, four, five or more hinge sections. A housing having one hinge section is especially suitable. The housing which may be folded as an envelope or other suitable container is also suitable. Advantageously, amongst its many possible uses the housing may be used to support a product either on the housing or adsorbed or absorbed in the housing, for example. Advantageously, the housing may be selected from the group consisting of a test kit housing, a diagnostic test kit housing and an immunodiagnostic test kit housing. Alternatively, the housing may be for other purposes such as to hold a sample of a product (e.g. perfume).

The material may be in the form of a substantially planar housing which may be selected from the group consisting of a test kit housing, a diagnostic test kit housing and an immunodiagnostic test kit housing. Typically the substantially planar housing is foldable to form the housing. Thus in use as a housing it is typically folded rather than being in a substantially planar configuration. On the other hand when a housing is subjected to the process of the invention it is typically subjected to the process when it is in a substantially planar configuration. The housing may comprise a wood pulp product such as cardboard. In particular, the immunodiagnostic test kit housing typically comprises a wood pulp product such as cardboard. Advantageously, the material is in the form of an immunodiagnostic test kit housing.

The material may be in the form of a substantially planar housing which may be selected from the group consisting of a test kit housing, a diagnostic test kit housing and an immunodiagnostic test kit housing wherein said required amount of moisture removed from said material is selected from the group consisting of absolute dryness and near measurable absolute dryness without spoiling the housing.

The material may be in the form of a substantially planar housing which may be selected from the group consisting of a test kit housing, a diagnostic test kit housing and an immunodiagnostic test kit housing a hinge section wherein said required amount of moisture removed from said material is removed by selectively and differentially irradiating said housing to control the degree of drying of the housing without spoiling the hinge section.

The material may be in the form of a substantially planar housing which may be selected from the group consisting of a test kit housing, a diagnostic test kit housing and an immunodiagnostic test kit housing having a hinge section and edges wherein said required amount of moisture removed from said material is removed by selectively and differentially irradiating said housing to control the degree of drying of the housing without spoiling the hinge section and the edges.

The material may be in the form of a substantially planar housing which may be selected from the group consisting of a test kit housing, a diagnostic test kit housing and an immunodiagnostic test kit housing having a hinge section and edges wherein said required amount of moisture removed from said material is removed by selectively and differentially irradiating said housing to control the degree of drying of the housing without spoiling the hinge section and the edges.

The material may be in the form of a substantially planar housing which may be selected from the group consisting of a test kit housing, a diagnostic test kit housing and an immunodiagnostic test kit housing having edges and wherein said required amount of moisture removed from said material is removed by selectively and differentially irradiating said housing to control the degree of drying of the housing without spoiling the edges.

The irradiating may be substantially continuous throughout the process.

Alternatively, the irradiating comprises pulses of microwave irradiation throughout the process. The irradiating may comprises pulses of microwave irradiation at a predetermined frequency of irradiation pulses to suit the processing properties of the material. The predetermined frequency of irradiation may comprise a pulse sequence duration and timing $T_2$ of between 0.02 and 1.50 times the material transfer time $T_1$ through a single microwave waveguide pass when operating in $TE_{10}$ mode. Typically the pulse sequence duration and timing $T_2$ is in the range of 0.25 to 2.50 seconds.

The process may be carried out under the simultaneous control of the process microwave residence time (being $T_1 \times N$ where N is the number of microwave waveguide passes), said material surface temperature, applied microwave power W and drying air dry bulb temperature and wet bulb temperature at a pressure selected from atmospheric pressure and sub-atmospheric pressure.

The temperature under which the process is carried out will be dependent on the material. For example, for a wood pulp product a typical temperature range is the range of 10–60° C., typically 20–55° C. More typically the temperature is in the range of 20–55° C. and the partial vapour pressure of water is less than about 70% of saturation. Yet more typically the temperature is in the range of 45–55° C. (such as at 45° C. 46° C., 47° C., 48° C., 49° C., 50° C., 51° C., 52° C., 53° C., 54° C. or 55° C., for example) and the partial vapour pressure of water is less than about 30% of saturation, typically 5–30%, 4–25%, 4–20%, 4–16%, 4–15%, 4–12%, 4–10%. And even more typically the temperature is about 50° C., 51° C., 52° C., 53° C., 54° C. or 55° C. and the partial vapour pressure of water is about 5 to about 15% of saturation. Typically, the partial vapour pressure of water in the environment is in the range of 1–80%, more typically 3–75%, 3–70%, 3–60%, 3–50%, 3–40%, 3 30%, 3–25%, 3–20%, 3–15%, 3–12%, 3–10%, 3–8% or 3–5% of saturation.

In the apparatus of the invention (a) may comprise: means for subjecting the material in a controlled temperature and humidity environment, said environment being at a temperature and partial vapour pressure of water which do not spoil the material, and, in which the partial vapour pressure of water of said environment is substantially below saturation;

Alternatively, in the apparatus (a) may comprise:

means for subjecting the material to a controlled pressure and humidity environment, said environment being at a pressure, temperature and partial vapour pressure of water which do not spoil the material, and, in which the partial vapour pressure of water of said environment is substantially below saturation.

As another alternative in the apparatus of the invention (a) may comprise:

means for subjecting the material to a controlled pressure, temperature and humidity environment, said environment being at a pressure, temperature and partial vapour pressure of water which do not spoil the material, and, in which the partial vapour pressure of water of said environment is substantially below saturation.

The means for irradiating may comprise means for continuously irradiating.

Alternatively, the means for irradiating comprises means for irradiating with pulses of irradiation. Typically the means for irradiating comprises means for irradiating with pulses of irradiation at a predetermined frequency of irradiation pulses to suit the processing properties of the material.

The apparatus may comprise means to simultaneously control the process microwave residence time (being $T_1 \times N$ where N is the number of microwave waveguide passes), said material surface temperature, applied microwave power W and drying air dry bulb temperature and wet bulb temperature at a pressure selected from atmospheric pressure and sub-atmospheric pressure.

In the process of the invention the processing parameters are chosen (e.g. process microwave residence time, material surface temperature, applied microwave power W, humidity, environment temperature, environment pressure, drying air dry bulb temperature and web bulb temperature) so that the material does not burn, cook or incur surface damage during the irradiating with microwave irradiation so as not to spoil the material. In the process of the invention the relationships between the process microwave residence time, the applied microwave power W, process environment temperature, environment pressure, drying air dry bulb temperature vapour pressure, the product surface temperature and surface vapour pressure are important relationships and influencing factors in product processing. For any given material a certain amount of routine trial an error will normally be required in order to optimise the relationships and avoid spoiling the material.

The material may be irradiated a plurality of times, e.g. 2–8,000, more typically 2 to 5,000, even more typically 2 to 1,000, yet even more typically 2–100 and even more typically 2 to 10 (or even more typically 2 to 50, 2 to 25, 5 to 10 times) with continuous or pulsed microwave irradiation.

Typically, the amount of microwave irradiation is sufficient to substantially maintain the vapour pressure at the surface, until a required amount of moisture has been removed from said material, without substantial reduction of the surface temperature of the material.

Advantageously, the apparatus of the invention may include a surface temperature sensor such as a fibre optic temperature sensing device or an infra red sensing device to measure and monitor the surface temperature of the material.

This invention provides by way of example a process and apparatus for the high speed microwave drying of a planar material by the simultaneous integrated control of the material processing speed and surface temperature, microwave irradiation power input and processing environment dry bulb temperature and wet bulb temperature when operating under atmospheric or sub-atmospheric pressure.

The process and apparatus of the invention provide for high speed microwave processing of planar materials or materials presented for processing in planar form for controlled irradiation, heating or drying or dehydration or disinfection or pasteurization or sterilization or curing or any one or more of these processes under continuous production line conditions without spoiling the material for its intended purpose.

A process of and apparatus of the invention provide for high speed microwave drying of immunodiagnostic test kit housings to reduce the housing moisture content to absolute or near measurable absolute dryness or to a controlled specified residual moisture content when operating under continuous in-line production conditions without spoiling the housing material for its intended purpose. In the process and apparatus of the invention the required drying process depending on the material (e.g. a wood pulp product such as cardboard) can be achieved typically in less than 20 seconds processing residence time and preferably in 10 to 15 seconds and more preferably in 6 to 10 seconds or even more preferably in less than 6 seconds. In the process and apparatus of the invention in which conjugate ribbon assembled material is similarly processed under controlled temperatures below 40° C. without adverse impact on the antibody and antigen compounds or spoiling of the material for its intended purpose.

In the process and apparatus of the invention the product being processed may be a diagnostic housing having a hinge section which may be selectively and differentially irradiated so as to control the degree of drying of the housing face material and the hinge section to avoid failure of the hinge due to excessive drying and brittlement which may otherwise occur.

In the process and apparatus of the invention controlled drying air and pre-treatment and cooling air conditions are provided by a refrigerated dehumidifying air recirculating heat pump system utilising magnetron waste heat as a recoverable heat source to supplement condenser waste heat and evaporator run-around air to water sensible heat transfer heat exchangers. The balance of energy being used to provide conditioned cooling air for end product cooling, magnetron air cooling and machine enclosure environmental control.

In the process and apparatus of the invention the material may subjected to microwave irradiation simultaneously to both faces of the material in each waveguide pass thereby creating a balancing of the forces acting on the material, thereby speeding the process, reducing the material temperature rise and eliminating warping of the material.

In the process and apparatus of the invention the controlled pre conditioned drying air, cooling air and material pre-treatment air is applied equally and simultaneously to both faces of the subject material in a manner to create a scrubbing action together with irradiation on both sides of the material thereby resulting in the processing of the material without measurable variation in material size, warping, burning, discoloration or breakdown of the cellular structure of the material or its surface treatment or otherwise spoilt for its intended purpose.

According to an embodiment of this invention in its preferred form the process will operate at the internationally approved (ISM) 2450 MHz microwave heating frequency but may also operate at other available frequencies including 896, 915, 922 and 2375 MHz. The microwave electromagnetic heating frequencies typically used in the processes of the invention 896, 915, 922 and 2450 MHz±permitted deviations which are provided by international agreement. The preferred frequency is 2450 MHz. Other microwave frequencies that may be used include those in the range 915±25 to 22,125±125 megacycles/second more usually 915±25 to 7,500±50 megacycles/second.

The term "spoil" throughout the specification and claims is to be taken as meaning that a material that is spoilt is no longer suitable for its intended use because it has been spoilt. For example a material having bubbling, burn marks, brittleness, curling, limpness, warping or other undesirable characteristics would be a spoilt material.

BEST MODE AND OTHER MODES FOR PERFORMING INVENTION

Figure 6:
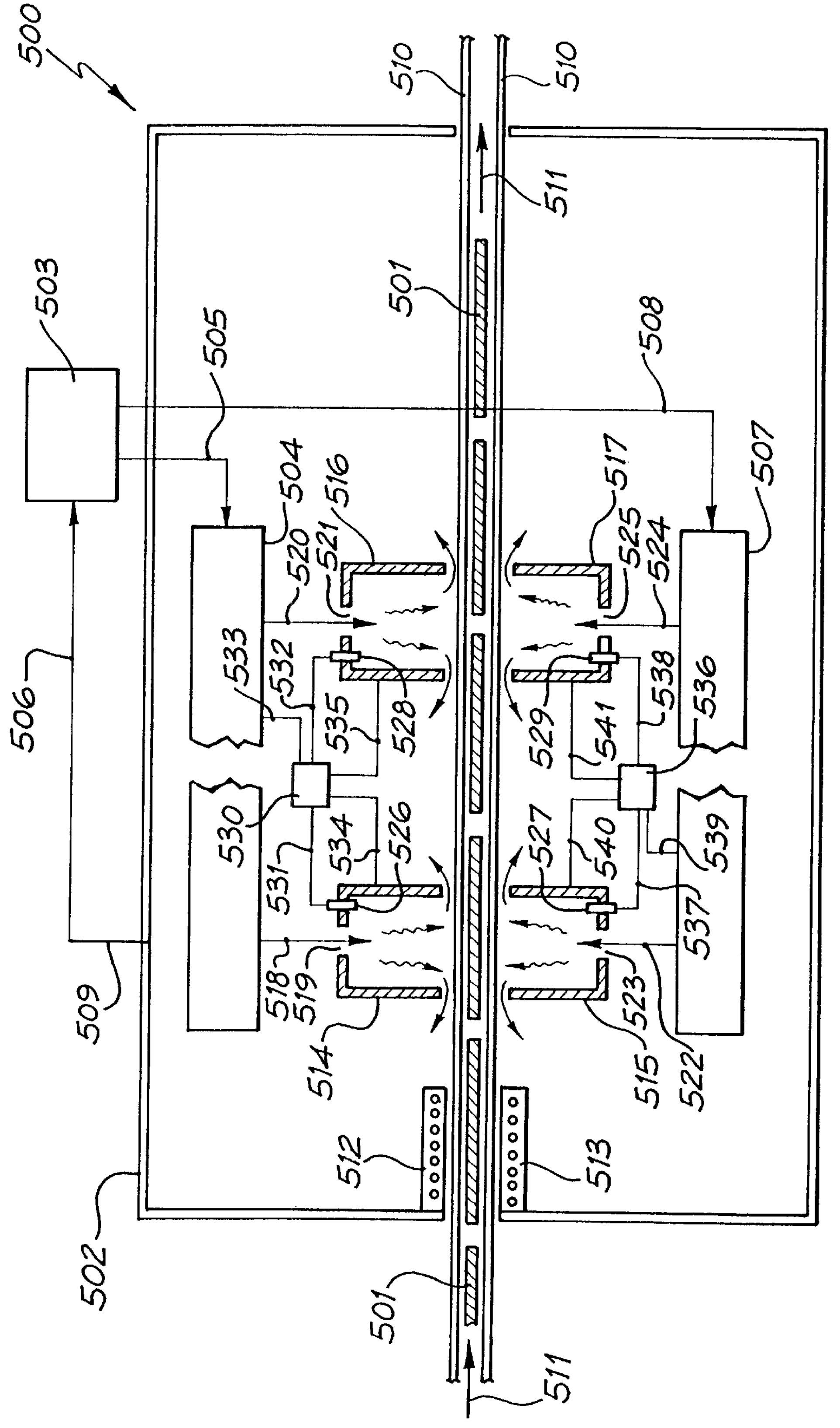
FIG. 6 depicts a schematic perspective view of a third apparatus of the invention.

FIG. 6 depicts an apparatus 500 for removing moisture from a material 501 without substantially spoiling material 501. Apparatus 500 includes chamber 502 which provides a controlled humidity environment within chamber 502 by via dehumidifying, recirculating, refrigeration heat pump condensing system 503 which is linked to conditioned manifold 504 via input line 505 and to conditioned air manifold 507 which is linked to condensing system 503 via input line 508. Chamber 502 has an exhaust line 509 which is linked to condensing system 503 via line 506. Material 501 is transported through chamber 502 via conveyer 510 in the direction depicted by arrow 511. Within chamber 502 microwave choke section 512 and 513 which are constructed to control microwave omissions from microwave chambers 514, 515, 516 and 517 to within internationally recognised standards. Conveyer belt 510 is typically an open mesh microwave transparent sandwich conveyer belt system or other microwave transparent material transport apparatus which transports material 501 in a plane to chambers 514, 515, 516 and 517 at specific locations. Such locations and spacings of material 501 are related to the microwave radiation energy nodes in chambers 514, 515, 516 and 517 whereby only selected predetermined areas of material 501 are irradiated when the material passes through chambers 514, 515, 516 and 517. Conditioned air manifold 504 provides conditioned air to chamber 514 via line 518 and 519 and to chamber 516 via line 520 and 521. Conditioned air manifold 507 provides conditioned air to chamber 515 via line 522 and slot 523 and to chamber 517 via line 524 and slot 525. Conditioned air manifolds 504 and 507 condition air within chamber 502 and chambers 514, 515, 516 and 517 such that the pressure, temperature and humidity of the environment are at a pressure, temperature and partial vapour pressure of water which to not spoil material 501 and in which the partial vapour pressure of water within chambers 502, 514, 515, 516 and 517 is substantially below saturation.

Chambers 514, 515, 516 and 517 provide means for irradiating selected areas of material 501 which are in the respective chambers with an amount of microwave irradiation effectively to increase moisture at the surface of material 501 whereby the vapour pressure at the surface is greater than the vapour pressure of the environment immediately adjacent to the material 501 whereby moisture is transferred from the surface of the material 501 to that environment and wherein the amount of the microwave irradiation and the selected area irradiated do not spoil material 501. The combination of condensing system 503 and conditioned air manifolds 504 and 507 provide means for maintaining the temperature and the partial vapour pressure of water within chambers 502 and chambers 514, 515, 516 and 517 substantially below saturation whereby material 501 is not spoiled when it is irradiated with microwaves in chambers 514, 515, 516 and 517. The amount of microwave irradiation in each of chambers 514, 515, 516 and 517 is sufficient to substantially maintain the vapour pressure at the surface of material 501 until a required amount of moisture has been removed material 501 without substantially reducing the surface temperature of material 501 and is sufficient to maintain the surface temperature of material 501 at substantially the same temperature as the dry bulb:temperature of the environment within chambers 502, 514, 515, 516 and 517.

Chambers 514, 515, 516 and 517 are generally capable of irradiating material 501 with pulses of microwave irradiation at a predetermined frequency of irradiation pulses to suit the processing properties of material 501. Chambers 514, 515, 516 and 517 have temperature sensors 526, 527, 528 and 529 which sense the temperature of material 501 as well as the temperature of the environment within chambers 514, 515, 516 and 517 respectively. Sensors 526 and 528 connected to controller 530 via lines 531 and 532. Controller 530 is connected to conditioned air manifold 504 via line 533 and to chamber 514 via line 534 and chamber 516 via line 535. Sensors 527 and 529 are connected to controller 536 via lines 537 and 538. Controller 536 is connected to manifold 507 via line 539 and to chamber 516 via line 540 and to chamber 517 via line 541. Detailed descriptions on conveyer systems, processing, microwave energy input, microwave power control, integrated system control, vapour extraction/condensing heat pump system, heat pump system control and feedback mechanisms are described in U.S. Pat. No. 5,980,962 the contents of which are incorporated herein by cross reference.

In use material 501 is located conveniently within conveyer belt 510 which is set moving in the direction of arrow 511. The humidity of chambers 502, 514, 515, 516 and 517 as well as the temperature and pressure of those chambers is set to the desired values which are appropriate for the material to be processed. As material 501 passes into chamber 502 and chambers 514, 515, 516 and 517 it is subjected to the control pressure, temperature and humidity environment therein. The environment being at a pressure, temperature and partial vapour pressure of water which do not spoil the material and which the partial vapour pressure of water of the environment is substantially below saturation. On passing into chambers 514 and 515 material 501 is irradiated with an amount of microwave radiation effective to increase the moisture at the surface of the material whereby the vapour pressure at the surface is greater than the vapour pressure of the environment within chambers 514 and 515 whereby moisture is transferred from the surface of material 501 to the environment in chambers 514 and 515 wherein the amount of the microwave irradiation and the area of material 501 which is irradiated do not spoil material 501. Thus, if material 501 has a hinge then the microwave irradiation is such so as not to substantially irradiate the hinge. Also the microwave irradiation is directed so as not to substantially irradiate the edges of material 501. Where material 501 has a hinge it is disposed on conveyer belt 510 such that the hinge is substantially parallel to direction 511. Whilst material 501 is within chambers 514 and 515 and undergoing irradiation the temperature of chambers 514 and 515 are maintained substantially below saturation whereby the material is not spoilt while it is being irradiated in those chambers. The amount of microwave irradiation of material 501 whilst it is in chamber 514 is typically about equal to the amount of microwave irradiation in chamber 515 to prevent warping of material 501. The amount of microwave irradiation in chamber 514 and chamber 515 is sufficient to substantially maintain the vapour pressure of water at the surface of material 501 until a required amount of moisture has been removed from material 501 without substantially reducing the surface temperature of material 501 and is sufficient to maintain the surface temperature of material 501 at substantially the same temperature as the dry bulb temperature of the environment in chambers 514 and 515. The temperature of the environment in chamber 514 is sensed and monitored by sensor 526 and determined by controller 530 by line 531 which in turn, if appropriate, sends a signal to adjust the power of irradiation by line 534 and the flow of air by line 518. Similarly sensor 527 detects the surface temperature of the bottom microwave irradiated surface of material 501 which in turn is determined by controller 536 by line 537 which in turn, if appropriate, sends signal to adjust the power of microwave irradiation by line 540 and the amount of air flowing into chamber 515 by line 522. Sensor 528 performs a similar function to sensor 526 except that sensor 528 is in chamber 516 and controller 530 adjusts the microwave irradiation power, if appropriate, by line 535 and adjusts the air flow in line 520 by line 533. Sensor 529 in chamber 517 performs a similar function to sensor 527 except controller 536 is linked to sensor 529 by line 538 and adjusts, if appropriate, the microwave irradiation by signal by line 541 and adjust the air flow in line 524 by line 539. After passing from chambers 514 and 515 material 501 passes into chambers 516 and 517 where once again the top and bottom surfaces of material 501 are irradiated with an appropriate amount of microwave irradiation until a required amount of moisture has been removed from material 501 without substantially reducing the surface temperature of material 501 and sufficient to maintain the surface temperature of material 501 at substantially the same temperature as with dry bulb temperature of the environment in chambers 516 and 517 respectively. Where the material 501 is an immunodiagnostic test kit housing it is typically irradiated at about 50° C. and the partial vapour pressure of water is in the range of about 5 to about 15% of saturation.

Figure 7:
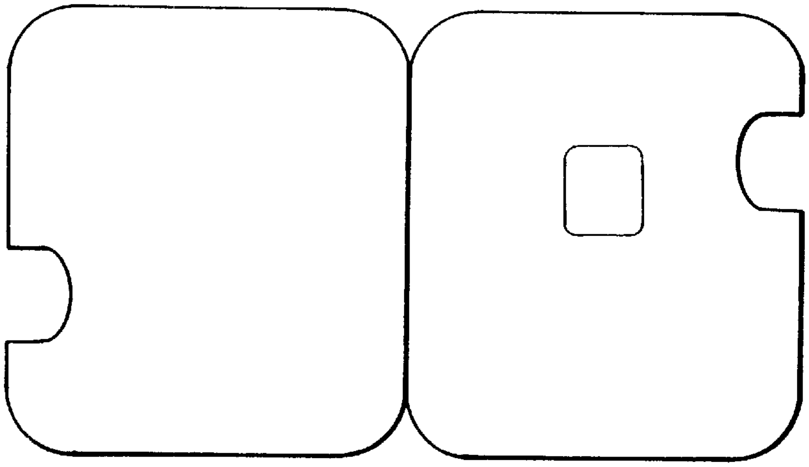
FIG. 7 depicts the back of an open immunodiagnostic housing.
Figure 8:
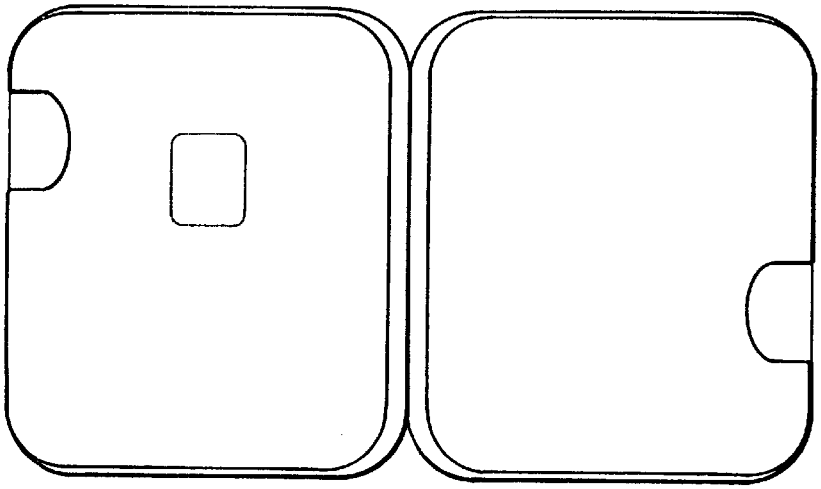
FIG. 8 depicts the front of an open immunodiagnostic housing.
Figure 9:
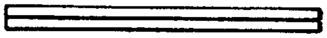
FIG. 9 depicts a side view of a closed immunodiagnostic housing in accordance with FIGS. 7 and 8.
Figure 10:
FIG. 10 depicts a side view of an open immunodiagnostic housing of FIGS. 7 and 8.
Figure 11:
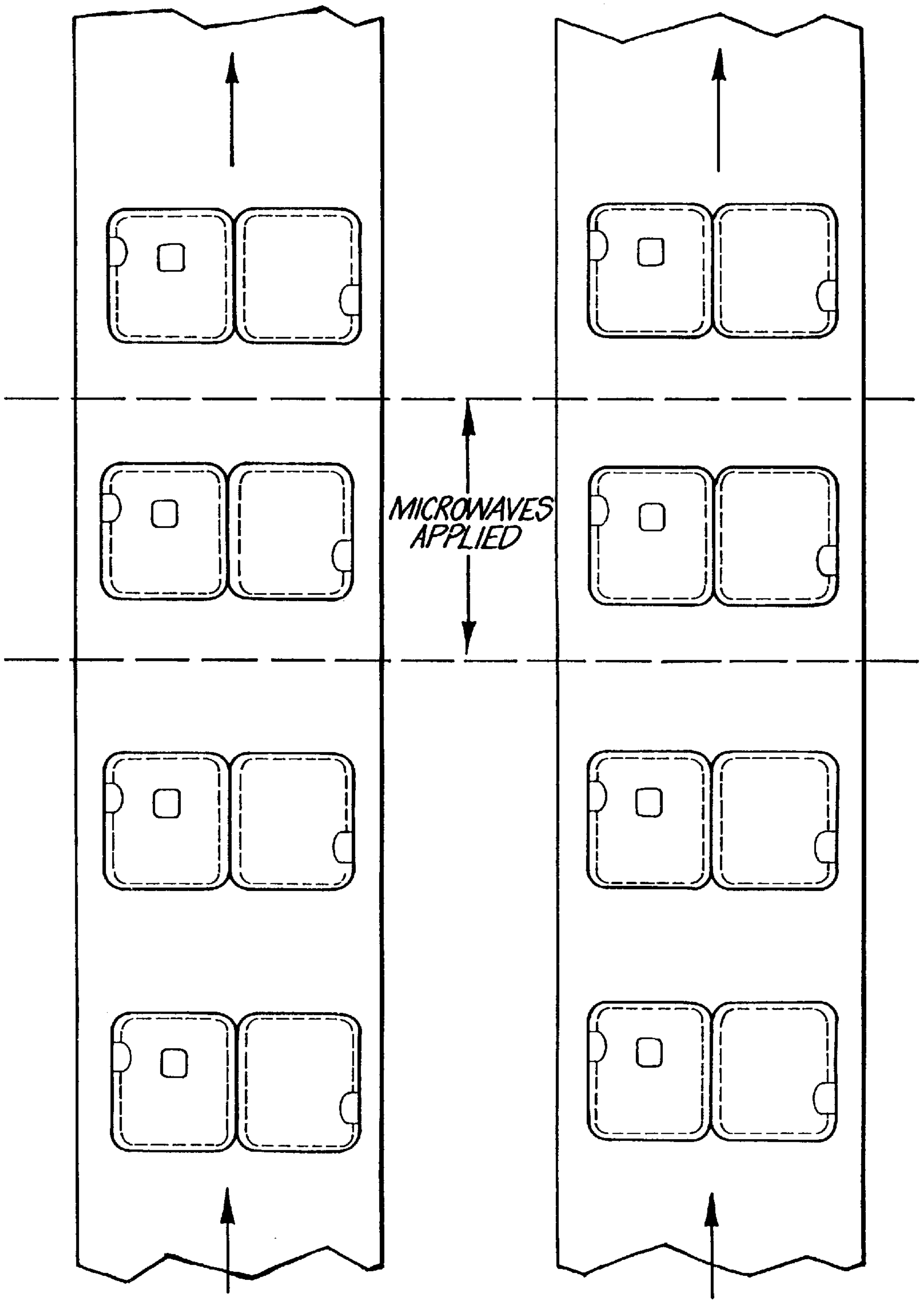
FIG. 11 depicts two conveyer belts running parallel to one another having disposed therein opened immunodiagnostic housings. The view is a top view.
Figure 12:
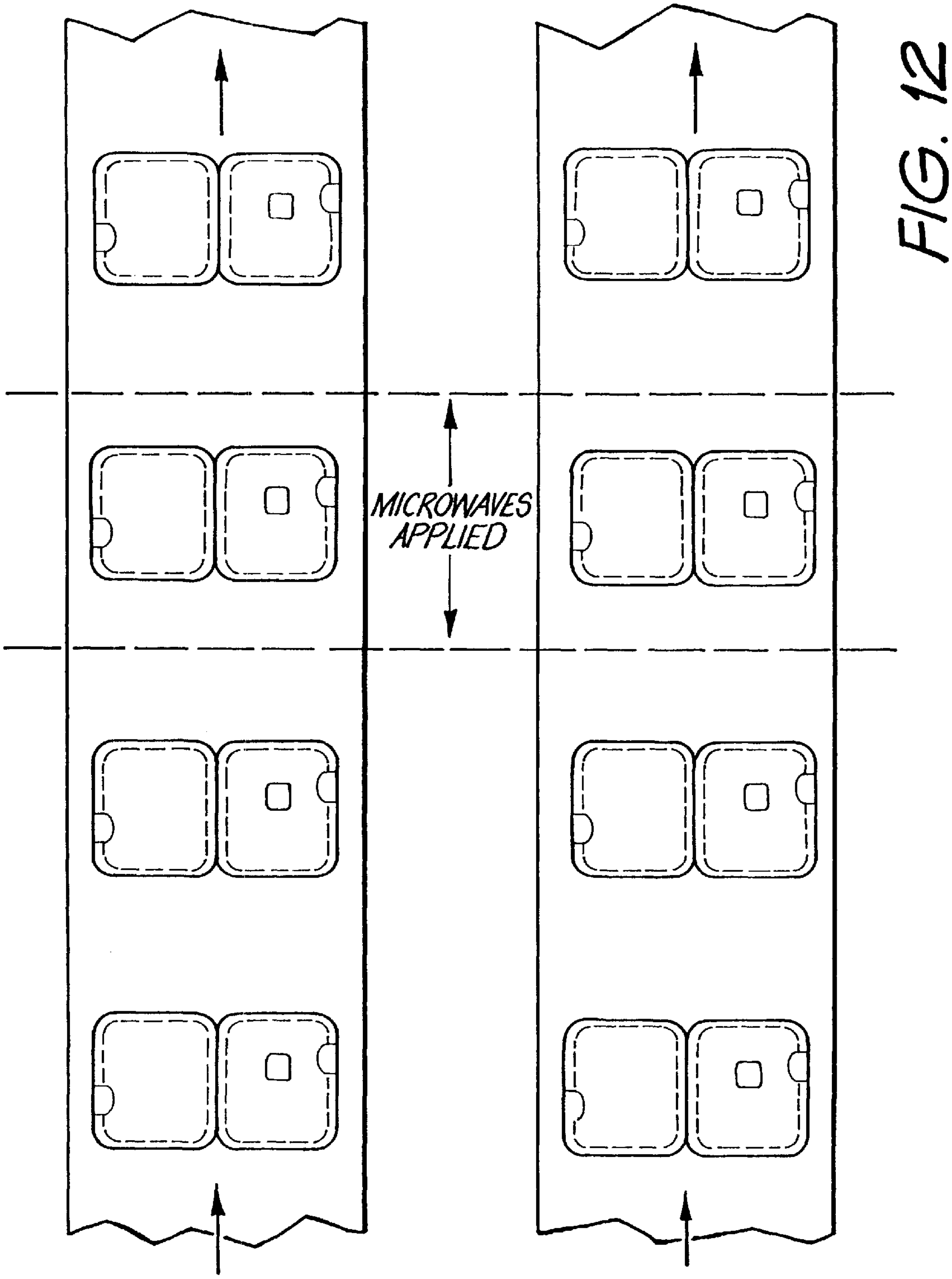
FIG. 12 depicts two conveyer belts running parallel to one another having disposed therein opened immunodiagnostic housings. The view is a bottom view.
Figure 13:
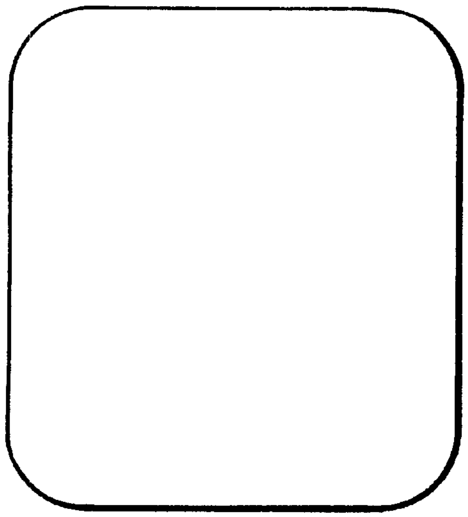
FIG. 13 is a top view of a card.
Figure 14:
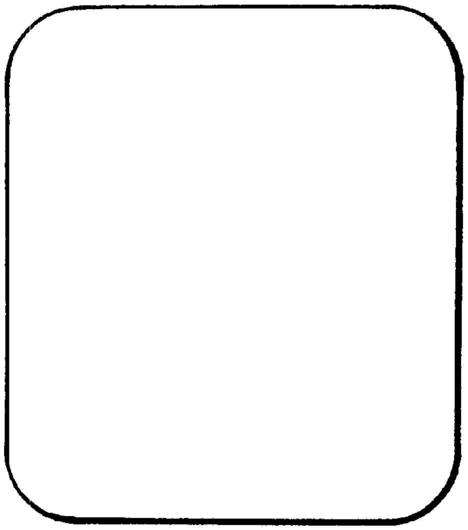
FIG. 14 is a bottom view of the card of FIG. 13.
Figure 15:
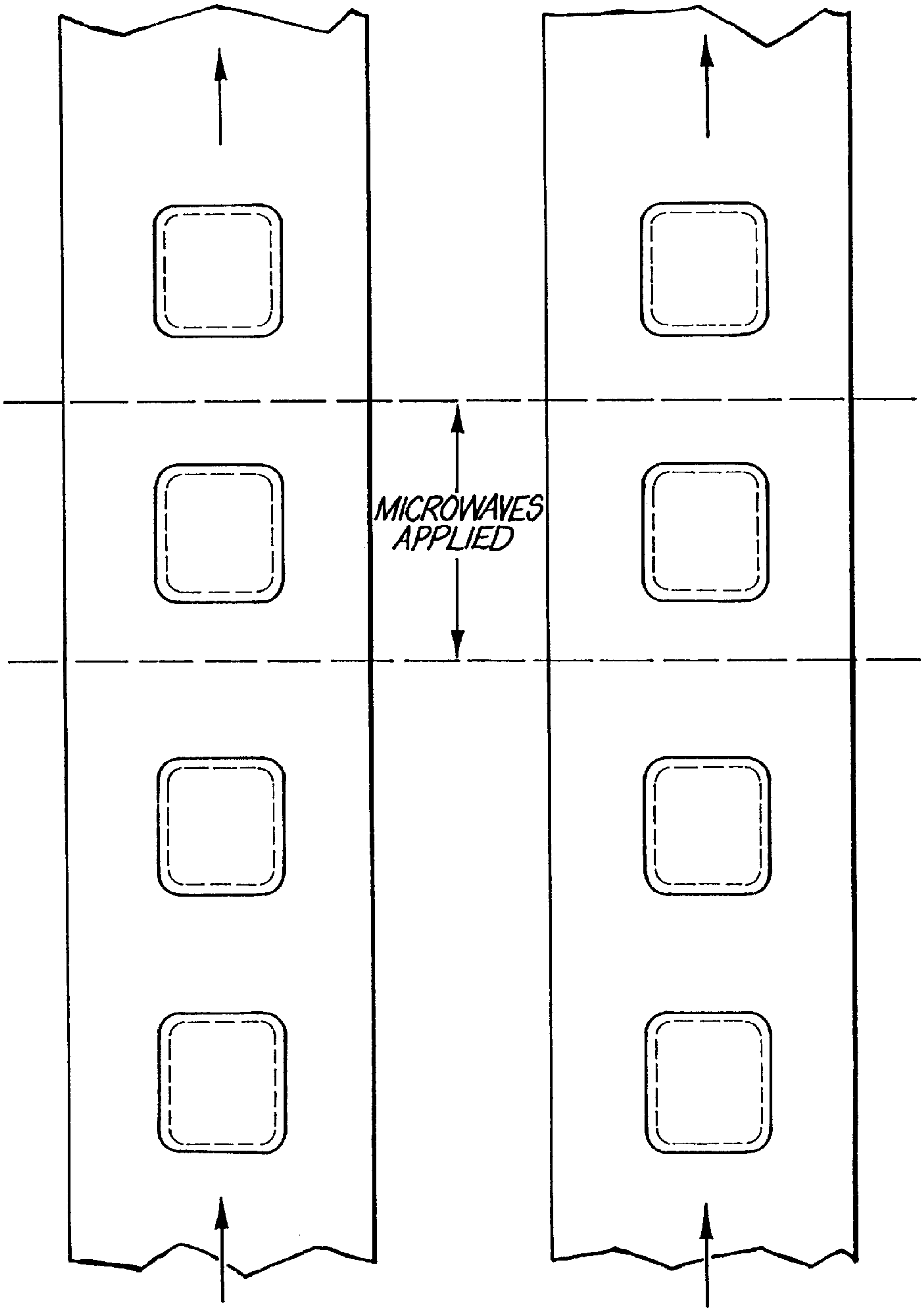
FIG. 15 depicts two conveyer belts having disposed therein the card depicted in FIGS. 13 and 14.

FIGS. 7, 8 and 10 depict the back, front and side view of an open immunodiagnostic housing and FIG. 9 depicts a side view of a closed immunodiagnostic housing strictly made of lacquered or unlacquered cardboard maybe readily dried in accordance with the process of the invention, FIG. 11 depicts the top view of two conveyer belts running parallel to one another having disposed therein a number of the opened immunodiagnostic housings of FIGS. 7 to 10 and FIG. 12 depicts a bottom view of the same two conveyer belts as FIG. 11. The dotted line in FIGS. 11 and 12 schematically depict the areas of the immunodiagnostic cards which are subjected to microwave irradiation. It will be noted that the dotted areas do not substantially incorporate the edges of the card or the hinge section of the cards. FIG. 13 is a top view of a card not having a hinge section and FIG. 14 is a bottom view of the card of FIG. 13. FIG. 15 depicts two conveyer belts having disposed therein the card depicted in FIGS. 13 and 14 the dotted line shown in FIG. 15 depicts the areas of the cards (which are typically made from cardboard) which are irradiated with microwave irradiation. It is noted that the edges of the cards are not substantially irradiated with microwave irradiation during processing.

In another preferred form the apparatus of the invention is depicted in FIGS. 1, 2, 3 and 5 utilises slotted waveguide travelling wave microwave technology preferably operating in the $TF_{-10}$ mode with microwave rectangular waveguide dimensions of 86.36±43.18± mm (2450 MHz) (1) provided with low or non-radiating product conveyance slot or slots of specific dimensions and spacing along the centreline of both wide faces of the waveguides (2) and a series of low or non-radiating air inlet openings in product matching locations along both narrow faces of the waveguides. (3)

It has been found by test results that the microwave processing efficiency of some materials processed in planar form with the simultaneous control of microwave power and product temperature during processing is enhanced by pulsing the microwave irradiation of the product. According to a further embodiment of this invention there is provided a means whereby the material being processed can be shielded from microwave irradiation at any predetermined sequential rate $T_2$ in the range ($T_1 \times 0.02$ to 1.50 or more (e.g. 1.5–3) where $T_1$ is the period of irradiation in a $TE_{10}$ mode waveguide at a nominated product processing speed and may typically vary between 0.25 to 2.5 seconds or more.

According to a further embodiment of this invention there is provided an assembly of single or multiple sections of microwave slotted waveguide (4) each comprising single or multiple pass waveguide sections assembled in a plane configuration such as to permit the passage of a product conveyor belt (5) or other material transportation device in a continuous plane through the waveguides via the slotted openings—the location and dimensions of which will cause a minimum of microwave radiation to escape from the waveguide by virtue of their location and dimensions and microwave choke provisions.

The microwave slotted waveguide sections are manufactured to controlled dimension and tolerances depending on the operating microwave frequency used. In a preferred form the waveguide sections are assembled in a horizontal plane and equipped with one or more air and/or water cooled microwave energy generating units (6) (magnetrons) isolators, (7) launching pieces, (8) microwave transparent window coupling, (9) air and water magnetron cooling system, (10) terminal dummy water load, (11) conditioned drying air manifolds and waveguide air inlet and extract provisions—all assembled within a thermally insulated microwave deck housing (13) complete with microwave choke sections and constructed to control microwave emissions to within internationally recognised standards Other configurations of the slot plane in the microwave sections may be vertical or inclined or in a concentric spiral form for some material applications.

According to a further embodiment of this invention in a preferred form there is provided a variable speed product feed mechanism (14) and conveying system whereby the subject material is conveyed from a product feeder onto an open mesh microwave transparent sandwich conveyor belt system (15) or other microwave transparent material transport apparatus in a plane through the microwave slotted waveguide assembly at a controlled location or locations. Such locations and spacings of material being related to the microwave radiation energy nodes in the waveguides where selective drying performance is required. In other preferred forms the material transport method may be gravity flow, vacuum, pneumatic, mechanical device or pump circulation.

According to a further embodiment of this invention there is provided an integrated air drying system (16) to evaporate the moisture forced from the subject material by the microwave irradiation energy. In one preferred form the drying air is supplied at a controlled temperature and humidity and pressure to create a turbulent drying air flow within the microwave waveguide to impinge on the conveyed material from each side of the product being conveyed and to maintain a positive air pressure within the waveguides with respect to the space surrounding the waveguides thereby ensuring a constant flow of humidified drying air from within the waveguide to a surrounding negative pressure area. The humidified drying air is prevented from surrounding the microwave magnetron antenna by the provision of a microwave transparent window (9) in the launching piece.

According to a further embodiment of this invention there is provided a product pre-processing conditioned air washing system and a processed product conditioned air cooling system (17) prior to material exit from the processing machine. In some applications the preferred form will incorporate a UV irradiation apparatus for surface sterilization of the process material prior to discharge.

In its preferred form the air drying system will comprise a dehumidifying, recirculating, refrigeration heat pump condensing system (18) in which the dehumidified air supply to the microwave processing unit is delivered to the housing of the machine at a controlled dry bulb temperature and relative humidity by utilizing the microwave generator cooling system waste heat and refrigeration condenser waste heat with the balance of condenser heat being used to provide conditioned air cooling to the magnetrons and electrical housing of the machine to thereby create its own controlled operating environment without causing any adverse impact on the surrounding ambient conditions and require only electrical and condensate drainage machine connections.

According to a further embodiment of the invention there is provided a microwave power supply system (19) and integrated systems control system (20) to simultaneously control the level of microwave power and product surface temperature and drying air dry bulb and wet bulb condition to satisfy the required rate of removal of moisture from the particular product at the required production rate. In a preferred embodiment of this invention the intensity of microwave energy will be applied to the microwave waveguides contraflow to the direction of product movement through the processing machine but may equally in some other processes be applied in the same direction as the product flow. In FIGS. 1–3 and 5 conditioned air manifolds (12) to distribute air to the microwave irradiation chambers are depicted schematically.

According to a further embodiment of the invention the apparatus of the invention includes a power control system which provides stable performance of the microwave generator high voltage power output under all operating load conditions for variations in electric supply line voltage fluctuations varying ±10% about the nominal AC voltage of the magnetrons. Such power control systems are available commercially and in the process of this invention is modified to operate under the computerised control of the integrated processing system control and sensing devices and sequence and safety interlocks.

A preferred form of power control system will incorporate high frequency series resonant topology and control system circuitry to maintain a nearly constant frequency over the useful operating output range.

Typically in the process of the invention one microwaves for about a 16 seconds residence time for 100 cards/min. By microwaving top and bottom the process takes out free moisture and bound moisture and as a result after processing the housings don't need silica gel or to be placed in an aluminium sachet to protect them from moisture. They also have an extended shelf life after processing. Typically in a production process of the invention the housings would go 4 across the conveyer belt It is important to dry the top and bottom faces of housing without drying the hinge or edges. Thus the faces are dried selectively with the result that there is no distortion. The microwaves are usually pulsed. In the process of the invention one lines up the housings during irradiation with the nodes of microwave to miss housing edges and the hinge. Otherwise housing edges tend to crack and hinge effects occur. A typical immunodiagnostic housing weighs 7 gm prior to processing and processing takes out 0.5 gm $H_2O$. It is thought that processing has a sealing affect which results in a barrier to moisture. Generally chemical or immunodiagnostic test pads are applied to a housing after drying the housing via the process of the invention. Where the housing is lacquered moisture comes out through lacquer during processing in accordance with the invention and consequently the processed housings become self sealing. However, similar results are obtained with unlacquered housings after processing in accordance with the invention. Typically during the process of the invention during irradiation with microwaves the housing is held at 50° C. and the air is dehumidified 5° air at 5% relative humidity. During the process the air may be maintained at a slight negative pressure or alternatively it may be at atmospheric pressure. During processing one should not get a smell of lacquer. The typical temperature during irradiation with microwaves is 30–55° C. and the irradiation time of microwaves is of the order of 15–20 seconds. The amount of microwave irradiation that it is typically used may be calculated as follows:

6,000/hr⇐@100 housings/min→6 kw
12,000/hr⇐@200 housings/min>12 kw

Housings are immersed in MW wage guide 6 kw for 20 seconds for 100 housings per housing 6000 watts 6000 housings/hr=1 watt energy to a dry housing.

Microwave irradiation is forcing $H_2O$ out from within housing wt. is immediately evaporated into preconditioned air.

If there is no temperature difference between the air and the housing, then on irradiation a large vapour pressure difference will develop between the housing and the air so moisture explodes into the air.

Figure 1:
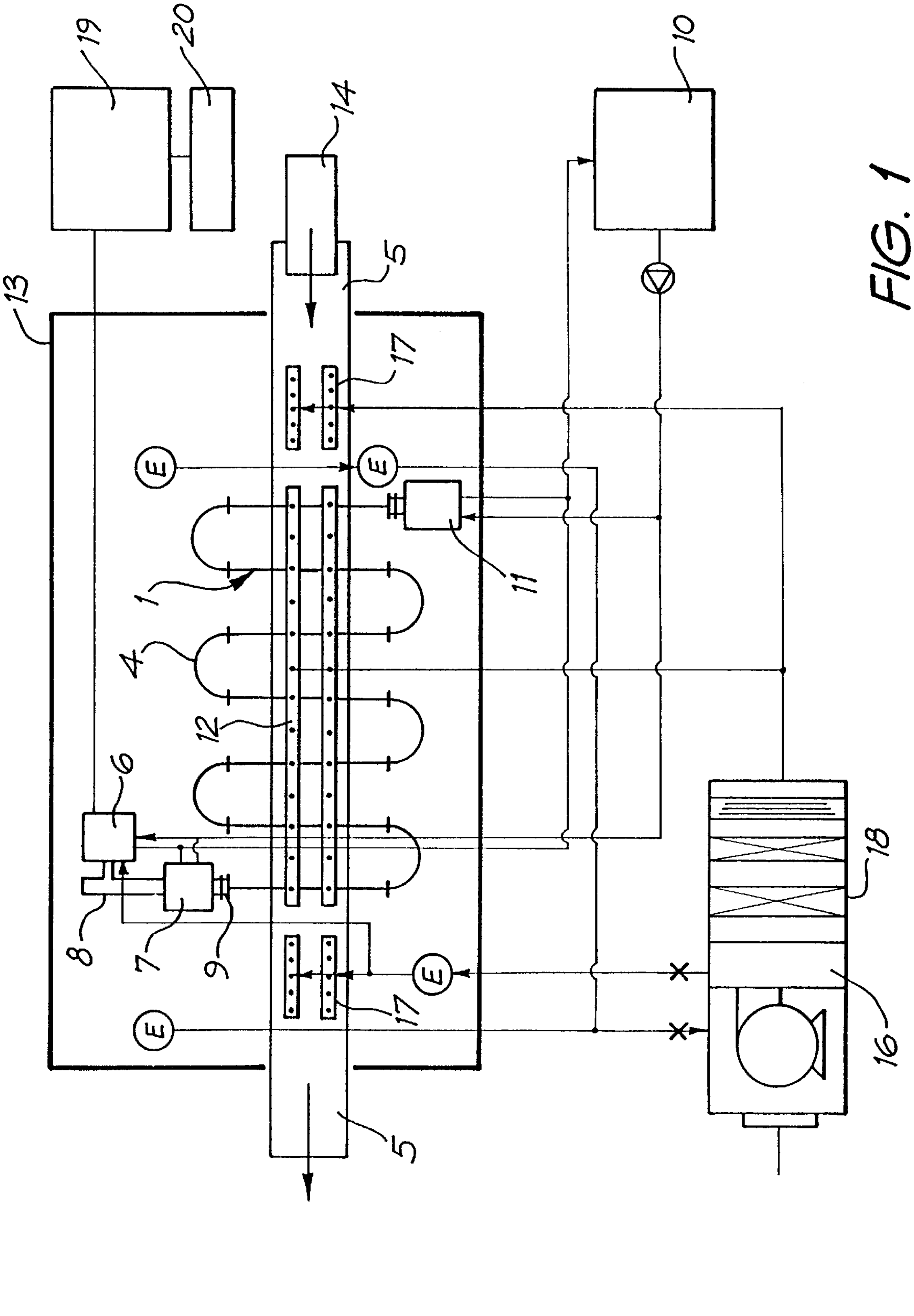
FIG. 1 depicts schematically a top view of a preferred apparatus of the invention.
Figure 2:
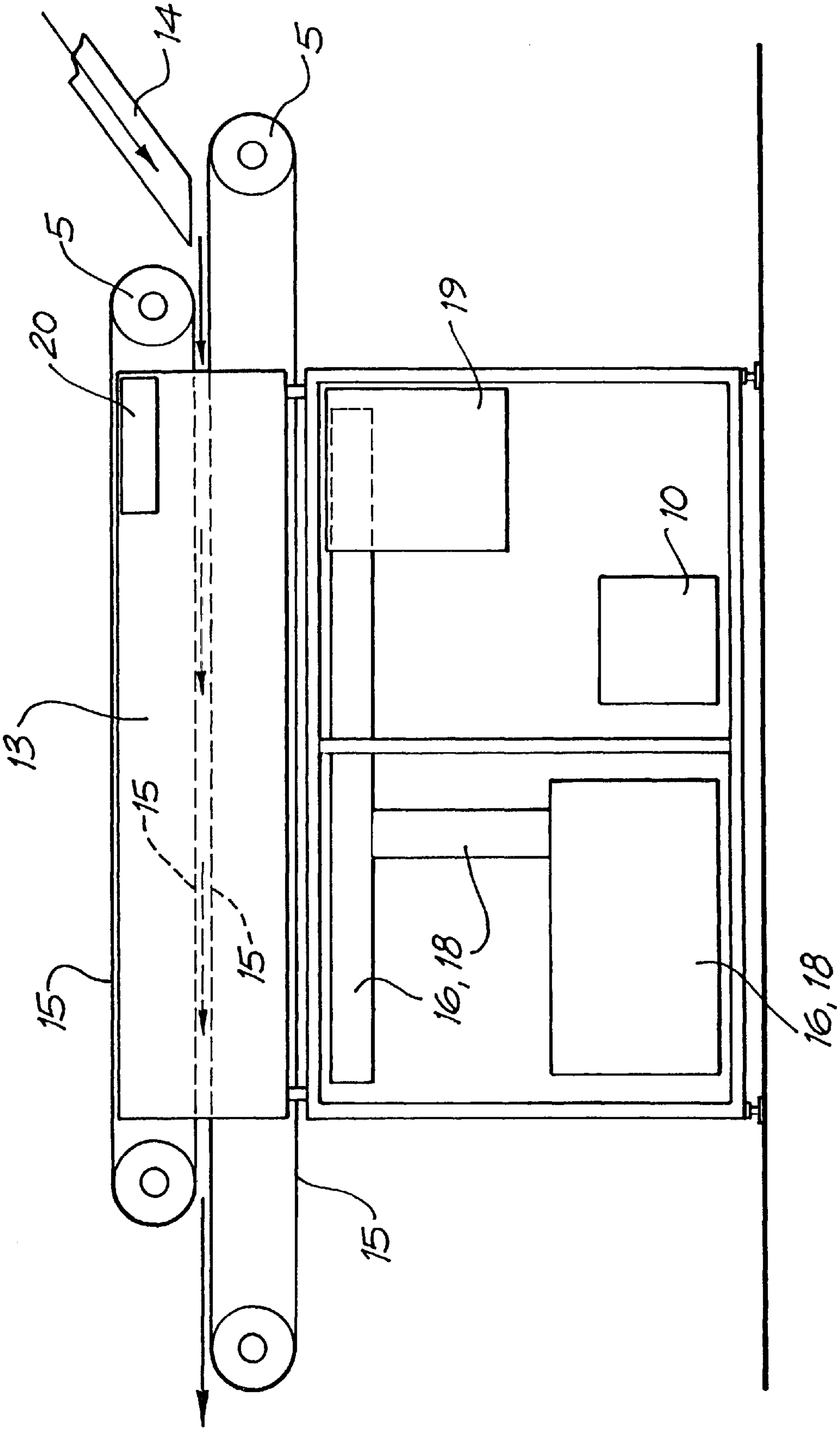
FIG. 2 depicts schematically a perspective view of the apparatus of FIG. 1.
Figure 3:
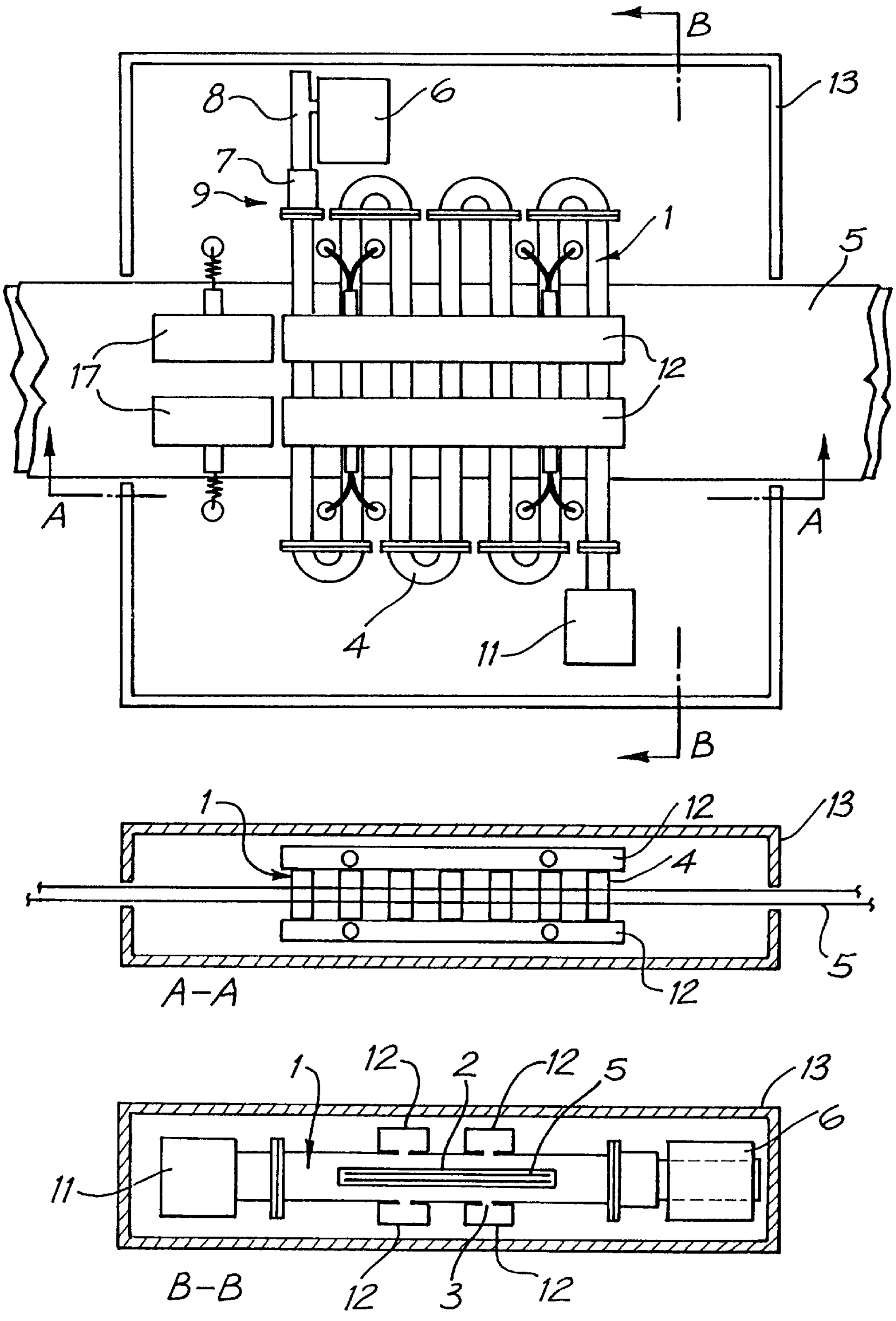
FIG. 3 depicts schematically a top view of the apparatus of FIG. 1 as well as two cross-sections of that apparatus.
Figure 4:
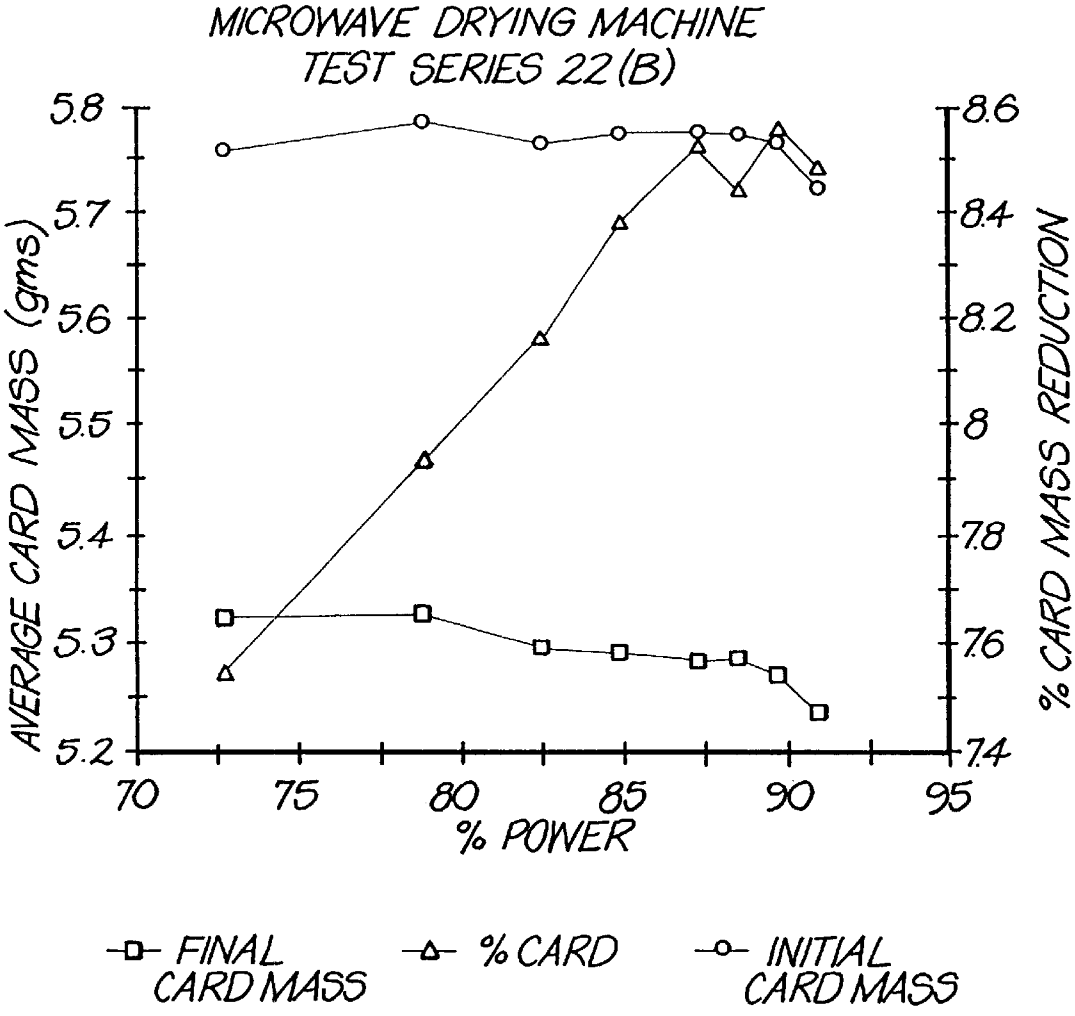
FIG. 4 depicts experimental results obtained using the apparatus and process of the invention.
Figure 5:
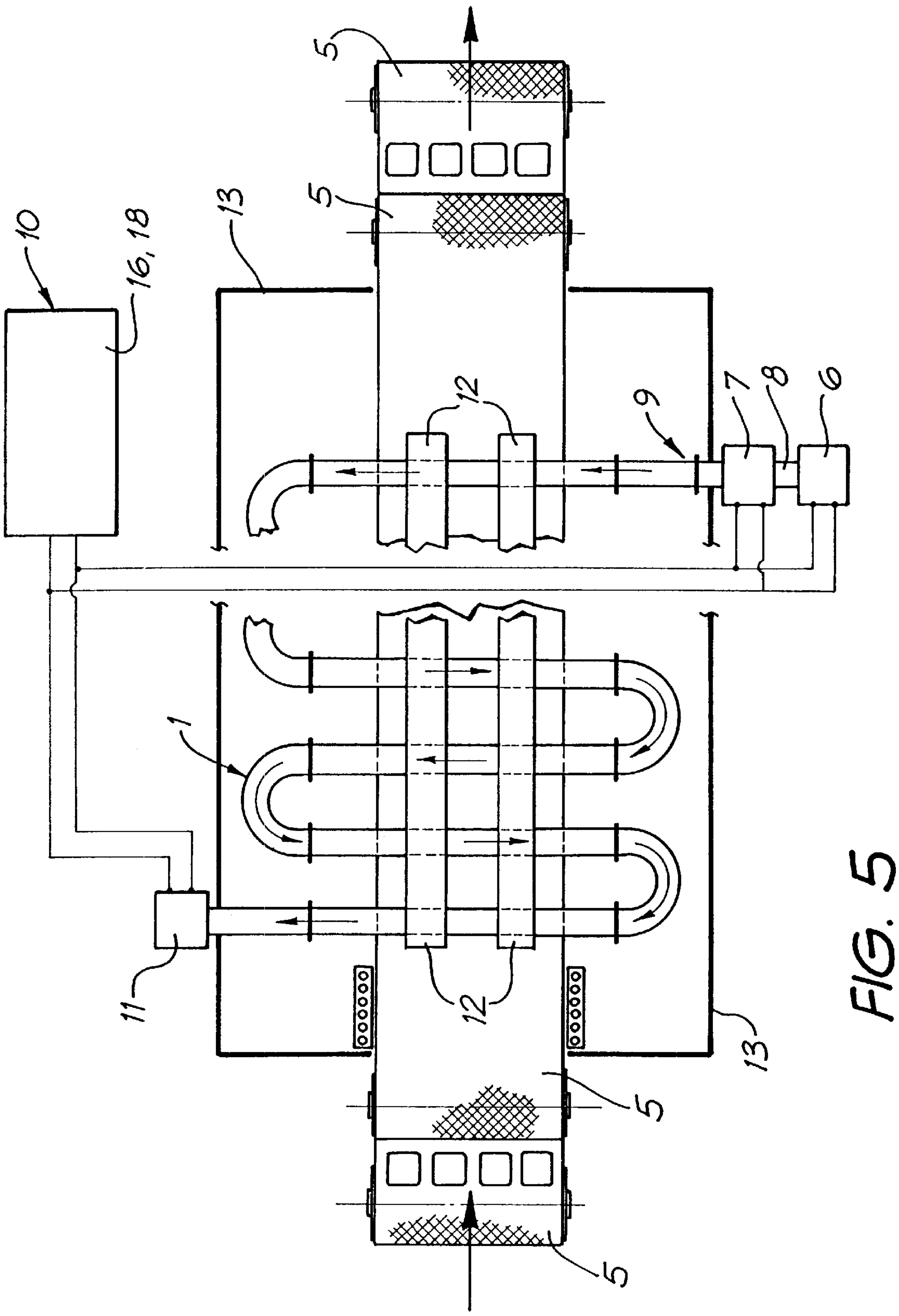
FIG. 5 depicts a further schematic top view of the apparatus of FIG. 1.

Pulsed microwaves may be provided as depicted in say FIG. 1 by forming wave guide with bend having a minimum space of about 50 mm between bends. In this way the bends have substantially no microwaves.

EXAMPLES

Processing tests carried out using medical diagnostic test kit housings in a prototype machine constructed in accordance with the process and apparatus of the invention and incorporating pulsed irradiation processing operating at production conveying speeds ranging from 1.0 to 10 meters per minute demonstrated that very high rates of moisture removal from the housings were repeatedly achievable to within 99.5% of measurable absolute dryness when operating with material residence time in the microwave environment ranging between 1.8 and 20 seconds as compared to hours or days required for alternative drying systems of lesser drying efficiency.

The tests also showed that the diagnostic test housings processed by the invention apparatus repeatedly produced a dried product without dimensional change, warping or discoloration with a surface temperature controllable below 50° C. and having a much lower moisture re-absorption rate when exposed to typical ambient humidity atmospheres ranging from 10% to 60% RH than was the case for housings dried by any other method.

Tests show that the reduced moisture take-up rate of lacquered housings is due to the virtual absolute moisture removal by the microwave generated internal vapour pressure forcing of the moisture gas molecules through the pores of the lacquer coating without damaging the coating which then offers a high resistance to the reverse transfer of atmospheric water vapour through the coating to the cardboard housing under normal atmospheric pressure conditions. The moisture take-up rates were typically more than 80% below identical material samples processed by other drying technologies including over drying at 100° C. when subjected in a 24° C. 22% RH environment and similar tests carried out in an ambient environment of 20° C. and 65% RH and 24° C. and 10% RH.

All tests demonstrated that by using the process and apparatus of the invention the diagnostic test. kit housings could be selectively and differentially dried at high speed without damage to of the cardboard hinge section of the housing or the spoiling of any part of the housing material. This was not the case with other drying systems which caused brittlement and failure of the housing hinge section under maximum drying conditions.

EXAMPLE APPARATUS AND TESTS

The example apparatus comprised a microwave system housing fitted with a seven pass 2450 MHz T10 mode rectangular serpentine slotted waveguide assembly terminated at one end in a 6 KW continuous wave water cooled 2450 MHz magnetron, National Electronics Model YJ1600 and Isolator Model 2727-163-02004 complete with magnetron launching piece with teflon window, arc detector and air and water cooling attachments.

The waveguide sections, bends, slots and overall length was manufactured to precise dimensions relative to the microwave frequency used such that node points of maximum and minimum energy intensity occurred at specific locations.

The last waveguide pass terminated in a microwave dummy water load to absorb any residual microwave energy not reflected to the isolator or absorbed by the material being processed. This water load and water cooling of the magnetron and isolator was incorporated in a continuously pumped water cooling circuit with the heat absorbed by same being extracted by an air to water heat exchanger forming part of the drying air conditioning system.

The demonstration apparatus was further provided with a microwave transparent teflon coated fibreglass open mesh conveyor system comprising a "sandwich" belt assembly to secure and transport the diagnostic housings in a plane through the aligned waveguide slots throughout the complete waveguide assembly and entering and leaving the microwave deck housing via low radiating slots fitted with microwave leakage chokes.

The conveyor system was fitted with head and tail shaft assemblies, belt tensioning and alignment devices and housing feeder and discharge assemblies and variable speed gear drive.

The example apparatus was equipped with an air handling system which could control the drying air temperature and humidity to simulate the impact of varying temperatures and humidities occurring in field practice.

Drying air was supplied to the waveguides in the manner of the invention at a pressure and velocity to ensure removal of humidified air whilst maintaining the microwave chamber at atmospheric and sub atmospheric pressures.

The microwave generator was provided with a Spellman Model MG10 high voltage magnetron power supply and control system to provide stable operation variable power control from zero to 100% full output.

Tests were carried out over a wide range of conveying speeds and housing moisture contents and microwave power level settings and spacing and location of housings to prove and demonstrate the invention with respect to moisture removal, selective drying and moisture take-up after processing. The results of the tests are given in Table 1 and are described below with reference to FIGS. 16 and 17.

Figure 16:
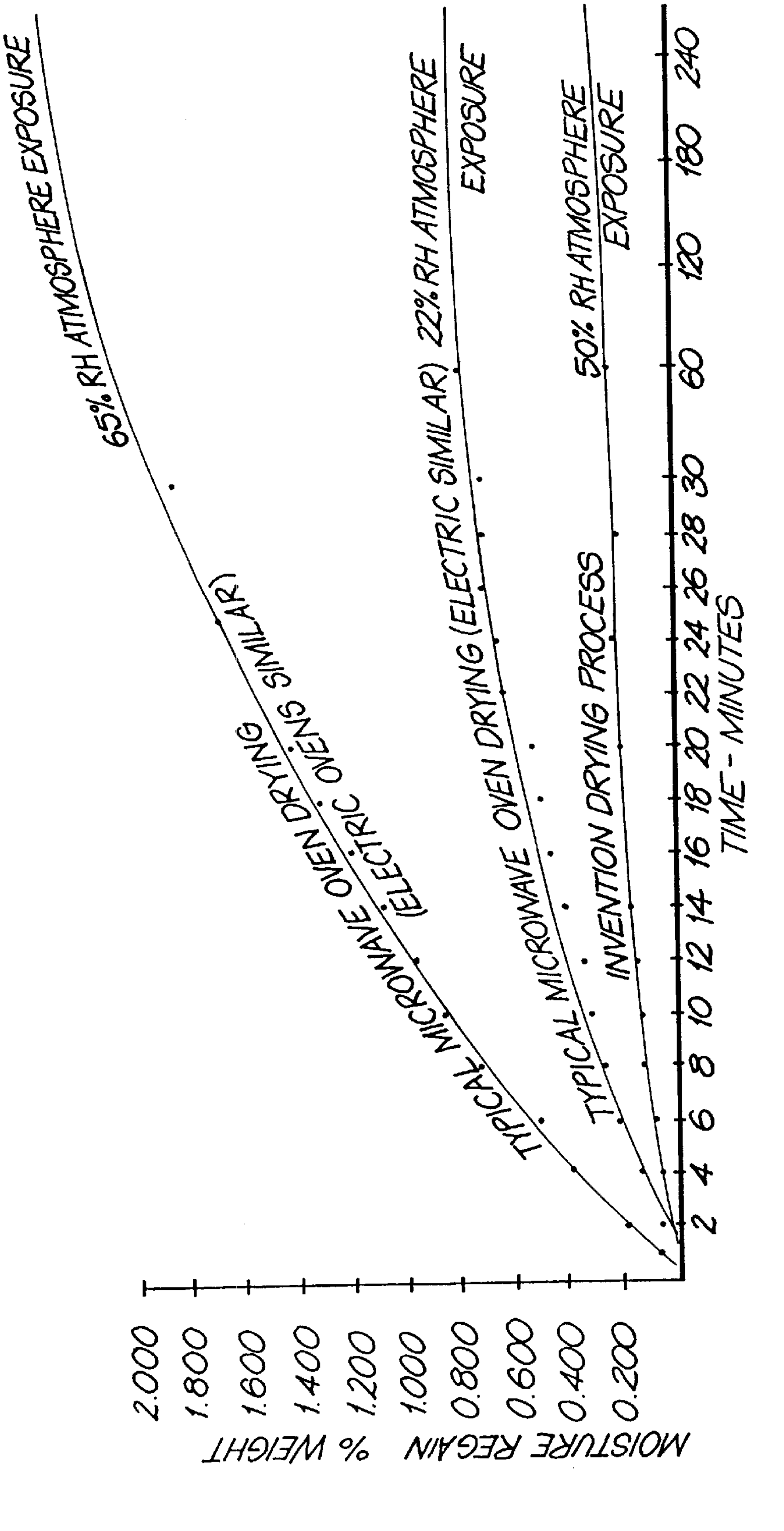
FIG. 16 depicts the comparative moisture take-up with atmospheric exposure after various drying processes.

FIG. 16 shows the comparative moisture take-up of dried diagnostic test cards when exposed to atmospheric conditions of different humidities.

The cards which are dried by electric ovens or microwave ovens (batch drying processes as described in FIG. 17) have a dramatically high moisture regain characteristic when exposed to atmospheres which are commonly experienced (22% to 65% RH) as compared with similar cards dried by the microwave invention process. These latter cards reach a low stabilization rate of regain even at 50% relative humidity.

This low moisture absorption characteristic of the cards dried by the invention process results in longer shelf life and performance reliability of the diagnostic test and eliminates the need for silica gel or other drying agents commonly used to protect products against moisture gain.

Figure 17:
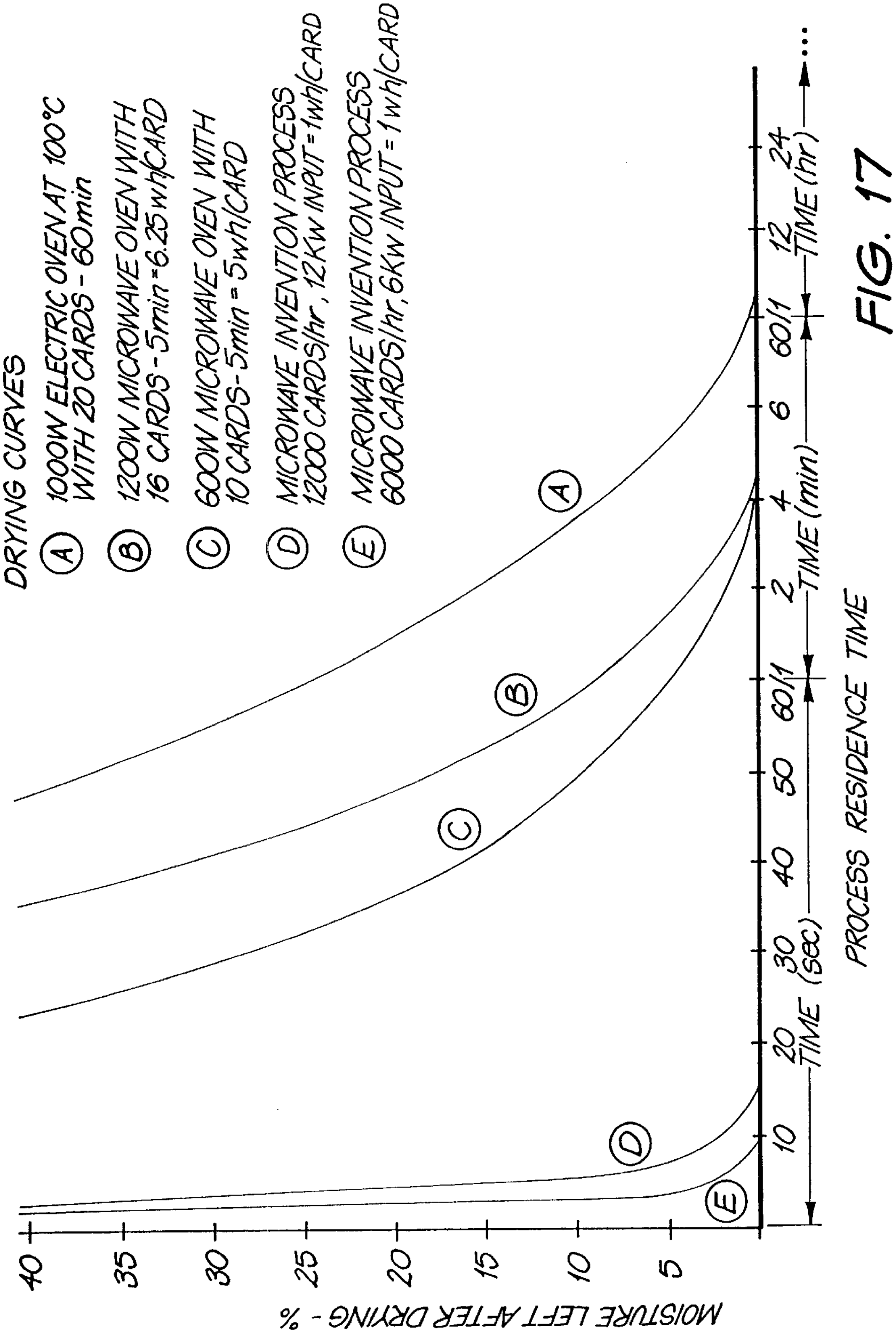
FIG. 17 depicts various drying curves-A-E.

The tests in FIG. 16 were carried out in conjunction with the tests described in FIG. 17. The drying curves in FIG. 17 compare the drying efficiencies of different drying processes in comparison with two microwave drying processes using the invention.

Curve A shows the drying performance using a standard 1000 w electric oven with top and bottom elements. Twenty (20) cards were supported on a rack on a central wire mesh tray with the cards shielded from direct infrared! radiation. The oven was controlled to 100° C. ambient condition for 60 minutes. A series of tests were carried out using batches of standard diagnostic test cards which were weighted before, during and after completion by the test. The curve represents the average drying curve with measurements taken every hour.

This process was a "batch" drying process in which each card had a residence time of one (1) hour.

The oven environment was naturally ventilated and was not provided with humidity control or pressure control.

A significant number of cards showed signs of browning and excess drying of the card hinge section with resulting early failure.

Curve B shows the drying performance using a standard domestic 1200 w microwave oven operating under full power for 5 minutes with 16 cards mounted on a rack to maximise radiation and air circulation.

The oven environment was naturally ventilated and was not controlled as to air temperature, humidity or pressure. The microwave power was not controlled to limit the surface temperature of the cards.

The residence time for each card under this test was 5 minutes.

This process uses a "batch" drying process. The results were measured on a 30 second basis and show the drying efficiency over a number of test batches. Some browning occurred together with excessive hinge drying.

Curve C was a similar test to that carried out under B but used a 600 watt domestic microwave oven for the drying of 10 cards similar to the cards used in A and B being a batch drying process the residence time for each card was 5 minutes. The improved performance of this drying test as compared with B was maintained over several tests and could be explained by the improved microwave coupling efficiency of the reduced volumetric capacity of the 600 watt oven. Neither the processing environment nor product temperature was controlled under these tests which also showed signs of browning and excessive drying of the hinge section of the cards.

Curve D illustrates the drying efficiency of the microwave invention process operated on a "continuous flow" basis when drying standard diagnostic test kit at a rate of 12000 cards per hour.

Tests were carried out over a range of residence times (8.5 to 16 seconds) with the processing air environment controlled as to temperature, humidity and slight negative air pressure and matching card surface temperature.

The tests repeatedly demonstrated that a controlled reduction in water vapour in the cards (varying up to the measurable total moisture removal) could be achieved by varying the microwave power input (energy source for the removal of moisture from the cards and for card surface temperature control) and varying the environmental temperature, humidity and pressure.

The optimum condition for maximum removal of moisture and freedom from burning or spoiling of the cards and hinge section represented the conditions described in the invention.

Curve E shows the drying performance of a microwave drying machine as described in the invention and similar to Curve D machine but processing 6000 cards per minute. The slight improvement in drying efficiency of this machine over the larger machine (Curve D) is believed to be due to larger expiry losses and slightly lower coupling efficiency of the larger machine Conclusion The drying performance of the microwave drying machines (D and E) as compared with the batch drying processes A, B and C is dramatic both in the control of the drying process and the very low unit energy requirement of 1 whr per card as compared to 50 wh/card for the batch drying process.

Standard cards

All tests were carried out using standard medical diagnostic test cards measuring approx 130 mm×75 mm×1.0 mm thickness with dividing paper pulp hinge and weighing approx 6–7 grams and having an initial moisture content of 7%±0.5% before processing.

Tests were also carried out on cards weighing up to 8 grams and below 6 grams having similar moisture percentage rates. Drying tests results were consistent with the large volume tests using cards of 6–7 grams weight.

TABLE I

CONTINUOUS MICROWAVE DRYING MACHINE

Test Series D

| | |
|---|---|
| Belt Speed (m/min): | 2,135 |
| Cards/min: | 51.18 |
| Residence Timg (s): | 8.76 |
| Max Power Ind: | 82.5 |
| Inlet Fan Setting: | 0.75 |
| Exhaust Fan Setting: | Full |
| Magnotron/F. Supply: | YJI600/MG10 |
| Volume Setting: | Full |
| Sample Size: | 20 |

TEST DATA

| | Mass 0 | Mass 1 | Loss | Indicated | Air Temp | | Water Temp | |
|---|---|---|---|---|---|---|---|---|
| Test | gm | gm | gm | Power | in | out | in | out |
| 11 | 115.16 | 106.47 | 8.60 | 60 | | | | |
| 12 | 115.71 | 106.53 | 8.18 | 55 | 47.2 | 37.7 | 30.0 | 38.5 |
| 15 | 115.30 | 105.89 | 9.41 | 68 | 47.3 | 38.2 | 31.2 | 42.2 |
| 13 | 115.49 | 105.81 | 9.68 | 70 | 46.9 | 37.3 | 32.4 | 40.1 |
| 10 | 115.51 | 105.60 | 9.85 | 72 | 49.3 | 37.4 | 34.3 | 44.2 |
| 17 | 115.48 | 105.73 | 9.75 | 73 | 40.4 | 37.8 | 32.2 | 40.2 |
| 16 | 115.29 | 105.42 | 9.87 | 74 | 49.0 | 38.7 | 34.9 | 36.0 |
| 14 | 114.45 | 104.74 | 9.71 | 75 | 49.4 | 30.4 | 34.1 | 37.1 |

TEST RESULTS (Average per Card)

| Test | Mass 0 gm | Mass 1 gm | Loss gm | % Card | % Power |
|---|---|---|---|---|---|
| 11 | 5.758 | 5.324 | 0.434 | 7.56 | 72.73 |
| 12 | 5.786 | 5.927 | 0.459 | 7.93 | 78.79 |
| 15 | 5.786 | 5.295 | 0.470 | 8.16 | 82.42 |
| 13 | 5.775 | 5.291 | 0.484 | 8.38 | 84.85 |
| 10 | 5.776 | 5.283 | 0.493 | 8.53 | 87.27 |
| 17 | 5.774 | 5.287 | 0.487 | 8.44 | 80.40 |
| 18 | 5.705 | 5.271 | 0.494 | 8.50 | 89.70 |
| 14 | 5.725 | 5.237 | 0.400 | 8.48 | 90.91 |

The claims defining the invention are as follows:

1. A process for removing moisture from a material without substantially spoiling the material, said process comprising:

(a) subjecting the material to a controlled humidity environment, said environment being at a temperature and partial vapour pressure of water which do not spoil the material, and, in which the partial vapour pressure of water of said environment is substantially below saturation;

(b) selectively and differentially irradiating at least one selected area of the material, the at least one selected area being less than the entire area of the material, without substantially irradiating a non-selected portion of the material, the selective and differential irradiation being in the environment with an amount of microwave irradiation effective to increase the moisture at the surface of the material whereby the partial vapour pressure of water at the surface of the material is greater than the partial vapour pressure of water of the environment whereby moisture is transferred from the surface to the environment, wherein the amount of said microwave irradiation and the selected area which is irradiated do not spoil the material; and (c) maintaining (i) the temperature of the environment, and, (ii) the partial vapour pressure of water of said environment substantially below saturation, whereby the material is not spoiled during step (b);

said amount of microwave irradiation being sufficient to substantially maintain said vapour pressure at the surface of the material, until a required amount of moisture has been removed from said material, without substantially reducing the surface temperature of the material and being sufficient to maintain the surface temperature of the material at substantially the same temperature as the dry bulb temperature of the environment.

2. The process of claim 1 wherein step (a) comprises:

(a) subjecting the material to a controlled pressure and humidity environment, said environment being at a pressure, temperature and partial vapour pressure of water which do not spoil the material, and, in which the partial vapour pressure of water of said environment is substantially below saturation.

3. The process of claim 1 wherein step (a) comprises:

(a) subjecting the material to a controlled pressure, temperature and humidity environment, said environment being at a pressure, temperature and partial vapour pressure of water which do not spoil the material, and, in which the partial vapour pressure of water of said environment is substantially below saturation.

4. The process of claim 1 wherein the material is a wood pulp product.

5. The process of claim 1 wherein the material is a wood pulp product in substantially planar form.

6. The process of claim 1 wherein the material is in the form of a housing selected from the group consisting of a test kit housing, a diagnostic test kit housing and an immunodiagnostic test kit housing.

7. The process of claim 6 wherein said temperature is in the range of 20–55° C.

8. The process of claim 6 wherein said temperature is in the range of 20–55° C. and the partial vapour pressure of water is less than about 70% of saturation.

9. The process of claim 6 wherein said temperature is in the range of 45–55° C. and the partial vapour pressure of water is less than about 30% of saturation.

10. The apparatus of claim 9 wherein the material has two faces and said means for irradiating includes means for simultaneously irradiating a selected area of both faces of said material with microwave irradiation.

11. The process of claim 6 wherein said temperature is about 50° C. and the partial vapour pressure of water is about 5 to about 15% of saturation.

12. The process of claim 1 wherein the material is in the form of a substantially planar housing which is selected from the group consisting of a test kit housing, a diagnostic test kit housing and an immunodiagnostic test kit housing.

13. The process of claim 1 wherein the material is in the form of a substantially planar housing which is selected from the group consisting of a test kit housing, a diagnostic test kit housing and an immunodiagnostic test kit housing wherein said required amount of moisture removed from said material is selected from the group consisting of absolute dryness and near measurable absolute dryness without spoiling the housing.

14. The process of claim 1 wherein said material is in the form of a substantially planar housing which is selected from the group consisting of a test kit housing, a diagnostic test kit housing and an immunodiagnostic test kit housing having a hinge section wherein said required amount of moisture removed from said material is removed by selectively and differentially irradiating said housing to control the degree of drying of the housing without spoiling the hinge section, the hinge being the non-selected portion of the material.

15. The process of claim 1 wherein said material is in the form of a substantially planar housing which is selected from the group consisting of a test kit housing, a diagnostic test kit housing and an immunodiagnostic test kit housing having a hinge section and edges wherein said required amount of moisture removed from said material is removed by selectively and differentially irradiating said housing to control the degree of drying of the housing without spoiling the hinge section and the edges, the hinge section and the edges being the non-selected portion of the material.

16. The process of claim 1 wherein said material is in the form of a substantially planar housing which is selected from the group consisting of a test kit housing, a diagnostic test kit housing and an immunodiagnostic test kit housing having edges wherein said required amount of moisture removed from said material is removed by selectively and differentially irradiating said housing to control the degree of drying of the housing without spoiling the edges, the edges being the non-selected portion of the material.

17. The process of claim 1 wherein said irradiating is substantially continuous throughout the process.

18. The process of claim 1 wherein said irradiating comprises pulses of microwave irradiation throughout the process.

19. The process of claim 1 wherein said irradiating comprises pulses of microwave irradiation at a predetermined frequency of irradiation pulses to suit the processing properties of the material.

20. The process of claim 14 wherein said predetermined frequency of irradiation comprises a pulse sequence duration and timing $T_3$ of between 0.02 and 1.50 times the material transfer time $T_1$ through a signal microwave waveguide pass when operating in $TE_{10}$ mode.

21. The process of claim 19 wherein said pulse sequence duration and timing $T_2$ is in the range of 0.25 to 2.50 seconds.

22. The process of claim 1 wherein said process is carried our under the simultaneous control of the process microwave residence time (being $T_1 \times N$ where N is the number of microwave waveguide passes), said material surface temperature, applied microwave power W and drying air dry bulb temperature and wet bulb temperature at a pressure selected from atmospheric pressure and sub-atmospheric pressure.

23. The process of claim 1 wherein the material has two faces, and a selected are of both faces of the material is subjected simultaneously to microwave irradiation.

24. A material form which moisture has been removed without substantially spoiling the material by the process of claim 1.

25. An apparatus for removing moisture from a material without substantially spoiling the material, said apparatus comprising:

(a) means for subjecting the material to a controlled humidity environment, said environment being at a temperature and partial vapour pressure of water which do not spoil the material, and, in which the partial vapour pressure of water of said environment is substantially below saturation;

(b) means for selectively and differentially irradiating at least one selected area of the material, the at least one selected area being less than the entire area of the material, without substantially irradiating a non selected portion of the material, the selective and differential irradiation being in the environment with an amount of microwave irradiation effective to increase the moisture at the surface of the material whereby the partial vapour pressure of water at the surface of the material is greater than the partial vapour pressure of water of the environment whereby moisture is transferred from the surface of the material to the environment, wherein the amount of said microwave irradiation and the selected area which is irradiated do not spoil the material; and (c) means for maintaining (i) the temperature of the environment, and, (ii) the partial vapour pressure of water of said environment substantially below saturation, whereby the material is not spoiled during processing when the material is irradiated with microwaves;

said amount of microwave irradiation being sufficient to substantially maintain said vapour pressure at the surface of the material, until a required amount of moisture has been removed from said material, without substantially reducing the surface temperature of the material and being sufficient to maintain the surface temperature of the material at substantially the same temperature as the dry bulb temperature of the environment.

26. The apparatus of claim 25 wherein (a) comprises:

means for subjecting the material to a controlled pressure and humidity environment, said environment being at a pressure, temperature and partial vapour pressure of water which do not spoil the material, and, in which the partial vapour pressure of water of said environment is substantially below saturation.

27. The apparatus of claim 25 wherein (a) comprises:

means for subjecting the material to a controlled pressure, temperature and humidity environment, said environment being at a pressure, temperature and partial vapour pressure of water which do not spoil the material, and, in which the partial vapour pressure of water of said environment is substantially below saturation.

28. The apparatus of claim 25 wherein said means for irradiating comprises means for continuously irradiating.

29. The apparatus of claim 25 wherein said means for irradiating comprises means for irradiating with pulses of irradiation.

30. The apparatus of claim 25 wherein said means for irradiating comprises means for irradiating with pulses of irradiation at a predetermined frequency of irradiation pulses to suit the processing properties of the material.

31. The apparatus of claim 25 comprising means to simultaneously control the process microwave residence time (being $T_1 \times N$ where N is the number of microwave waveguide passes), sad material surface temperature, applied microwave power W and drying air dry bulb temperature and wet bulb temperature at a pressure selected from atmospheric pressure and sub-atmospheric pressure.

* * * * *

UNITED STATES PATENT AND TRADEMARK OFFICE

CERTIFICATE OF CORRECTION

PATENT NO. : 6,546,646 B1

DATED : April 15, 2003

INVENTOR(S) : Donald S. Thomas

It is certified that error appears in the above-identified patent and that said Letters Patent is hereby corrected as shown below:

Title page,

Insert -- [30] Foreign Application Priority Data

Jan. 11, 1999 (AU) …. PP8084 --.

Signed and Sealed this

Twenty-sixth Day of August, 2003

JAMES E. ROGAN

*Director of the United States Patent and Trademark Office*